United States Patent
Wang et al.

(10) Patent No.: US 12,544,144 B2
(45) Date of Patent: Feb. 10, 2026

(54) DENTAL ROBOT AND ORAL NAVIGATION METHOD

(71) Applicant: Beijing Yakebot Technology Co., Ltd, Beijing (CN)

(72) Inventors: Lifeng Wang, Beijing (CN); Chen Shen, Beijing (CN); Bei Sun, Beijing (CN); Hongpeng Liu, Beijing (CN)

(73) Assignee: Beijing Yakebot Technology Co., Ltd, Beijing (CN)

( * ) Notice: Subject to any disclaimer, the term of this patent is extended or adjusted under 35 U.S.C. 154(b) by 922 days.

(21) Appl. No.: 17/378,194

(22) Filed: Jul. 16, 2021

(65) Prior Publication Data

US 2022/0015836 A1 Jan. 20, 2022

(30) Foreign Application Priority Data

Jul. 17, 2020 (CN) .......................... 202010693115.9

(51) Int. Cl.
*A61B 34/00* (2016.01)
*A61B 34/20* (2016.01)
(Continued)

(52) U.S. Cl.
CPC .............. *A61B 34/20* (2016.02); *A61B 34/30* (2016.02); *A61B 90/06* (2016.02); *A61B 90/39* (2016.02);
(Continued)

(58) Field of Classification Search
CPC ......... A61B 34/20; A61B 34/30; A61B 90/06; A61B 90/39; A61B 2034/2068; A61B 2090/067; A61B 2090/3937
See application file for complete search history.

(56) References Cited

U.S. PATENT DOCUMENTS

2006/0142657 A1* 6/2006 Quaid .................... A61B 90/37
                                                                600/424
2015/0057675 A1    2/2015 Akeel et al.
(Continued)

FOREIGN PATENT DOCUMENTS

CN    105395295 A    3/2016
CN    106420251 A    2/2017
(Continued)

OTHER PUBLICATIONS

European Patent Office; EP Application No. 21184459; European Search Report; 3 pages; dated Dec. 3, 2021.
(Continued)

*Primary Examiner* — Wade Miles
*Assistant Examiner* — Aaron G Cain
(74) *Attorney, Agent, or Firm* — Faegre Drinker Biddle & Reath LLP

(57) ABSTRACT

Embodiments of the present application provide a dental robot and an oral navigation method. The dental robot comprises a tandem positioning arm, wherein the tandem positioning arm comprises a pedestal, several positioning arms and a jacket, and the jacket is configured to clamp surgical instruments; the pedestal, the several positioning arms and the jacket are connected in series in sequence by rotary joints; a joint angle measuring device is mounted at each of the rotary joints. According to the dental robot and the oral navigation method provided by the present application, by the lightweight of the tandem positioning arm, the volume and weight of the dental robot system are reduced, which improves the practicality of the dental robot in surgical operations.

12 Claims, 3 Drawing Sheets

(51) Int. Cl.
  *A61B 34/30* (2016.01)
  *A61B 90/00* (2016.01)
(52) U.S. Cl.
  CPC . *A61B 2034/2068* (2016.02); *A61B 2090/067* (2016.02); *A61B 2090/3937* (2016.02)

(56) References Cited

U.S. PATENT DOCUMENTS

| | | | |
|---|---|---|---|
| 2016/0157964 | A1 | 6/2016 | Suttin et al. |
| 2018/0128710 | A1* | 5/2018 | Liu .................... G01M 13/021 |
| 2018/0185103 | A1 | 7/2018 | Mukumoto et al. |
| 2018/0263714 | A1 | 9/2018 | Kostrzewski et al. |
| 2019/0239969 | A1* | 8/2019 | Abu-Akeel .......... A61C 8/0089 |
| 2020/0121403 | A1* | 4/2020 | Awano .................. A61B 34/20 |
| 2020/0138518 | A1* | 5/2020 | Lang .................. A61B 17/1703 |
| 2020/0360096 | A1* | 11/2020 | Savall .................... A61B 34/35 |

FOREIGN PATENT DOCUMENTS

| | | |
|---|---|---|
| CN | 206228567 U | 6/2017 |
| CN | 107582193 A | 1/2018 |
| CN | 107595418 A | 1/2018 |
| CN | 108814740 A | 11/2018 |
| CN | 109382828 A | 2/2019 |
| CN | 109483556 A | 3/2019 |
| CN | 111407443 A | 7/2020 |
| CN | 212346790 U | 1/2021 |
| JP | H0577173 A | 3/1993 |
| JP | 1996224243 A | 9/1996 |
| JP | 2015506721 A | 3/2015 |
| JP | 2017012213 A | 1/2017 |
| JP | 201723339 A | 2/2017 |
| JP | 2018505014 A | 2/2018 |
| JP | 2018158104 A | 10/2018 |
| JP | 2019528910 A | 10/2019 |
| KR | 20130123192 A | 11/2013 |
| WO | 2018051276 A1 | 3/2018 |

OTHER PUBLICATIONS

Li, Jing et al.; A Customizable, Compact Robotic Manipulator for Assisting Multiple Dental Procedures; 2018 3rd International Conference on Advanced Robotics and Mechatronics (ICARM); IEEE; pp. 720-725; dated Jul. 18, 2018.
Japanese Patent Office; Notice of Reasons for Refusal; Japanese Application No. 2021-118002; 13 pages; dated Jul. 26, 2022.
Japanese Patent Office; Decision of Refusal; Japanese Application No. 2021-118002; 8 pages; dated Feb. 9, 2023.
Korean Patent Office; First Request for the Submission of an Opinion; Korean Application No. 10-2021-0093383; 16 pages; dated Nov. 11, 2022.
Korean Patent Office; Second Request for the Submission of an Opinion; Korean Application No. 10-2021-0093383; 15 pages; dated Feb. 17, 2023.
Korean Patent Office; Notice of Final Rejection; Korean Application No. 10-2021-0093383; 9 pages; dated Jun. 19, 2023.
Korean Patent Office; Notice of Allowance; Korean Application No. 10-2021-0093383; 6 pages; dated Nov. 1, 2023.
The State Intellectual Property Office of People's Republic of China; First Office Action; Chinese Application No. 202010693115.9; 24 pages; dated Jun. 22, 2024.
State Intellectual Property Office; Chinese Decision of Rejection and translation; Chinese Application No. 202010693115.9; 20 pages; dated Mar. 12, 2025.
State Intellectual Property Office; Chinese Notice of Allowance and translation; Chinese Application No. 202010693115.9; 11 pages; dated Jun. 25, 2025.

* cited by examiner

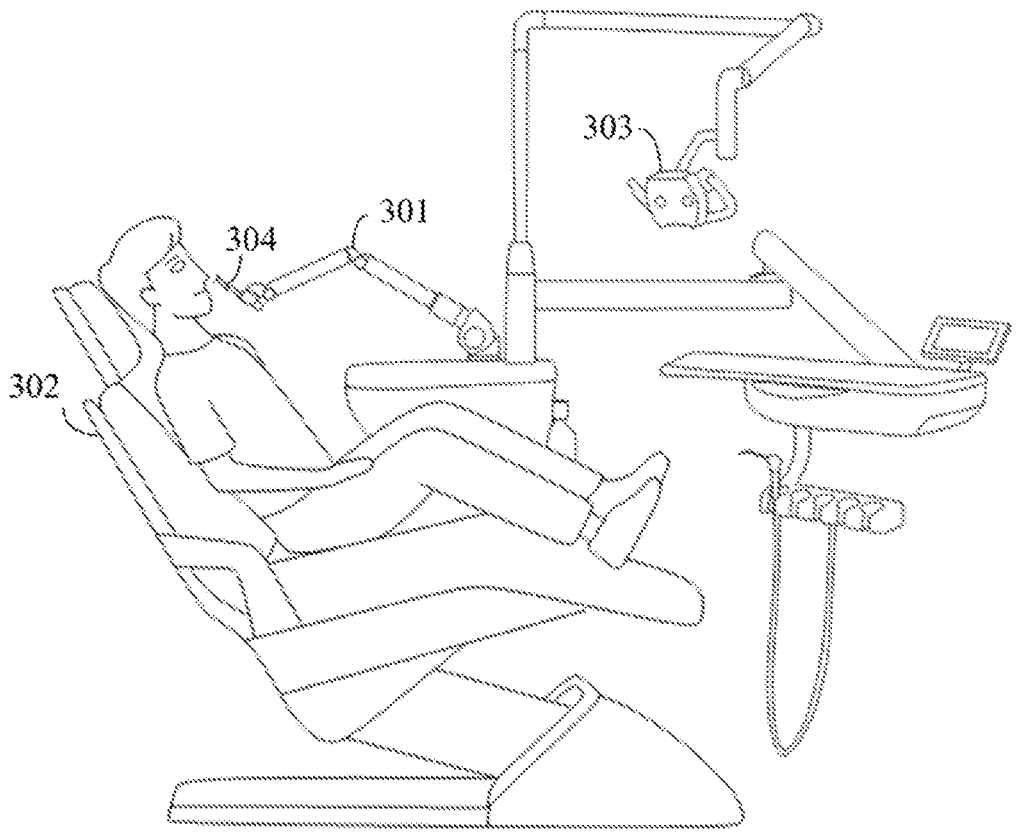

Fig. 3

| Determining a coordinate position of a surgical instrument clamped by the jacket disposed at a top of the tandem positioning arm in a coordinate system of dental robot based on joint angles measured by each joint angle measuring device in the tandem positioning arm | 410 |
|---|---|
| Converting the coordinate position of the surgical instrument in the coordinate system of dental robot to a coordinate position in a coordinate system of three-dimensional image | 420 |
| Performing oral navigation based on the coordinate position of the surgical instrument in the coordinate system of three-dimensional image, and preset surgical paths in the coordinate system of three-dimensional image | 430 |

Fig. 4

DENTAL ROBOT AND ORAL NAVIGATION METHOD

CROSS-REFERENCE TO RELATED APPLICATION

The present application claims priority to Chinese Application No. 202010693115.9 filed on Jul. 17, 2020, entitled "Dental Robot and Oral Navigation Method," which is hereby incorporated by reference in its entirety.

FIELD OF TECHNOLOGY

The present application relates to the technical field of medical apparatus and instruments, and in particular to a dental robot and an oral navigation method.

BACKGROUND

With the application of navigation technology and robot technology in oral and maxillofacial surgical operations, the degree of digitalization of oral surgery has been greatly improved. A robot-assisted oral navigation system may provide great help to dentists, thereby improving the accuracy of the surgeries, reducing the difficulty in surgical operations and guaranteeing surgical safety.

In the related art, dental surgery robot systems usually adopt general-purpose industrial mechanical arms, which results in not only a large volume and weight of the entire system, but also high cost and poor practicability.

SUMMARY

Embodiments of the present application provide a dental robot and an oral navigation method, so as to solve the problems of large volume and weight, as well as poor practicability of traditional dental surgery robot systems.

In a first aspect, an embodiment of the present application provides a dental robot, including a tandem positioning arm; wherein
  the tandem positioning arm includes a pedestal, several positioning arms and a jacket, and the jacket is configured to clamp surgical instruments;
  the pedestal, the several positioning arms and the jacket are connected in series in sequence by rotary joints;
  a joint angle measuring device is mounted at each of the rotary joints.

In an embodiment, the joint angle measuring device is an absolute encoder.

In an embodiment, the positioning arm has a hollow structure.

In an embodiment, a servo torque motor is mounted at each of the rotary joints.

In an embodiment, the dental robot further includes a dental treatment chair; wherein
  a head clamping device disposed on both sides of a headrest of the dental treatment chair has a pinion-rack locking structure; and
  the tandem positioning arm is fixedly mounted on an equipment base of the dental treatment chair by the pedestal.

In a second aspect, an embodiment of the present application provides an oral navigation method based on the dental robot according to the first aspect, including:
  determining a coordinate position of a surgical instrument clamped by a jacket disposed at a top of a tandem positioning arm in a coordinate system of dental robot based on joint angles measured by each joint angle measuring device in the tandem positioning arm;
  converting the coordinate position of the surgical instrument in the coordinate system of dental robot to a coordinate position of the surgical instrument in a coordinate system of three-dimensional image; and
  performing oral navigation based on the coordinate position of the surgical instrument in the coordinate system of three-dimensional image and preset surgical paths in the coordinate system of three-dimensional image.

In an embodiment, the converting the coordinate position of the surgical instrument in the coordinate system of dental robot to a coordinate position of the surgical instrument in a coordinate system of three-dimensional image includes:
  converting the coordinate position of the surgical instrument in the coordinate system of dental robot to a coordinate position of the surgical instrument in the coordinate system of three-dimensional image based on a spatial mapping relationship;
  wherein the spatial mapping relationship is determined based on coordinate positions of preset feature points on the three-dimensional image in the coordinate system of dental robot.

In an embodiment, after the performing oral navigation based on the coordinate position of the surgical instrument in the coordinate system of three-dimensional image and preset surgical paths in the coordinate system of three-dimensional image, the method further includes:
  determining a contact stiffness of the tandem positioning arm based on a preset working area of the surgical instrument in the three-dimensional image and the coordinate position of the surgical instrument in the coordinate system of three-dimensional image; and
  adjusting an output torque of the servo torque motor at each rotary joint in the tandem positioning arm based on the contact stiffness of the tandem positioning arm.

In an embodiment, before the performing oral navigation based on the coordinate position of the surgical instrument in the coordinate system of three-dimensional image and preset surgical paths in the coordinate system of three-dimensional image, the method further includes:
  determining a relative position of an area to be operated and the surgical instrument based on the positions of visual markers respectively disposed on the area to be operated and the surgical instrument;
  converting the relative position to a three-dimensional coordinate system to obtain a three-dimensional relative position; and
  adjusting a coordinate position of the area to be operated in the coordinate system of three-dimensional image based on the coordinate position of the surgical instrument in the coordinate system of three-dimensional image and the three-dimensional relative position.

In an embodiment, the visual markers of the area to be operated are mounted by an oral guide which is determined based on a three-dimensional curved surface of dentition within the area to be operated.

The embodiments of the present application provide a dental robot and an oral navigation method. The dental robot includes a tandem positioning arm, in which a pedestal, several positioning arms and a jacket are connected in series in sequence by rotary joints; a joint angle measuring device is mounted at each of the rotary joints. By the lightweight of the tandem positioning arm, the volume and weight of the dental robot system are reduced, and the practicality of the dental robot in surgical operations is improved.

BRIEF DESCRIPTION OF THE DRAWINGS

In order to illustrate the technical solutions of the embodiments of present application or the prior art more clearly, drawings needed in the description of the embodiments or the prior art will be briefly introduced below. Obviously, the drawings in the following description show some embodiments of the present application. For those of ordinary skill in the art, other drawings may be obtained based on these drawings without creative work.

FIG. 3 is a schematic structural diagram of a dental robot system according to an embodiment of the present application;

FIG. 4 is a schematic flowchart of an oral navigation method according to an embodiment of the present application.

REFERENCE NUMERALS

| 100 | pedestal | 110 | first positioning arm |
|---|---|---|---|
| 120 | second positioning arm | 101 | first rotary joint |
| 102 | second rotary joint | 103 | third rotary joint |
| 130 | jacket | 201 | pinion |
| 211 | first rack | 212 | second rack |
| 221 | first head support | 222 | second head support |
| 301 | tandem positioning arm | 302 | dental treatment chair |
| 303 | visual navigator | 304 | surgical instrument |
| 501 | oral guide | 502 | connecting rod |
| 503 | visual marker | | |

DETAILED DESCRIPTION

In order to illustrate the objectives, technical solutions and advantages of the embodiments of the present application more clearly, the technical solutions in the embodiments of the present application will be described clearly and completely in conjunction with the accompanying drawings in the embodiments of the present application. Obviously, the described embodiments are part of the embodiments of the present application, rather than all of the embodiments. All other embodiments obtained by a person of ordinary skill in the art based on the embodiments of the present application without any creative effort fall within the protection scope of the present application.

Figure 1:
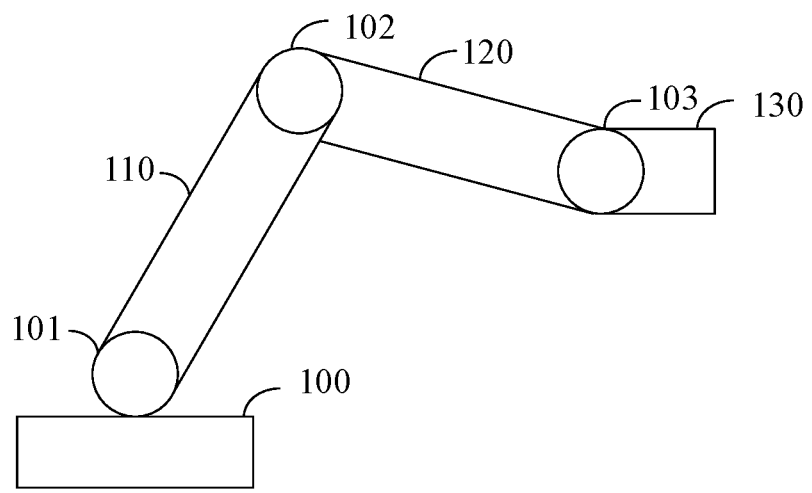
FIG. 1 is a schematic structural diagram of a dental robot according to an embodiment of the present application.

FIG. 1 is a schematic structural diagram of a dental robot according to an embodiment of the present application. As shown in FIG. 1, the dental robot includes a tandem positioning arm; the tandem positioning arm includes a pedestal 100, a first positioning arm 110, a second positioning arm 120 and a jacket 130, and the jacket 130 is configured to clamp surgical instruments; the pedestal 100, the first positioning arm 110, the second positioning arm 120 and the jacket 130 are connected in series in sequence by a first rotary joint 101, a second rotary joint 102 and a third rotary joint 103; and a joint angle measuring device is mounted at each of the rotary joints.

It should be noted that embodiments of the present application are described with a case where the number of positioning arms is two, and the embodiments are part of the embodiments of the present application, rather than all of the embodiments. In the embodiments of the present application, the number of positioning arms is not specifically defined.

In an embodiment, the pedestal 100, the first positioning arm 110, the second positioning arm 120 and the jacket 130 are connected in series by rotary joints. The jacket 130 is configured to clamp surgical instruments. The tandem positioning arm has at least 6 degrees of freedom, and may be used to position surgical instruments and adjust the posture thereof in the working space. In order to make the tandem positioning arm of the dental robot more flexible when being dragged or avoiding obstacles, the number of tandem positioning arms may also be flexibly adjusted, so that the tandem positioning arm has a structure with redundant degrees of freedom.

The traditional oral surgery robot system adopts general-purpose industrial mechanical arms and the mechanical arms are controlled by motors, making the surgery robots bulky in size and weight. When using surgery robots, dentists need to learn how to use and operate industrial mechanical arms, which increases the learning costs for dentists. In addition, different from the standardized production methods in the industry, in an oral surgery, the dentist is required to formulate different surgical plans based on each patient's specific conditions, and during the surgical operation, the dentist also needs to adjust surgical plans based on real-time feedback from each patient. Therefore, the traditional oral surgery robot system has poor practicability and inefficient use in surgical operations.

In the dental robot provided by the embodiments of the present application, the joint angle measuring device is mounted at each rotary joint of the tandem positioning arm, and the surgical instrument is positioned precisely through the joint angle measurement, which replaces the motor control, and reduces the application of electronic devices related to motor control, thereby enabling the lightweight of dental robots. In addition, a drag-and-drop operation manner is adopted to facilitate the flexible operation of the dentist, which is more in line with the dentist's usage habits and will not bring any learning costs to the dentist.

The embodiments of the present application provide a dental robot, including a tandem positioning arm in which the pedestal, several positioning arms and the jacket are connected in series in sequence by rotary joints; and a joint angle measuring device is mounted at each of the rotary joints. By the lightweight of the tandem positioning arm, the volume and weight of the dental robot system are reduced, which improves the practicality of the dental robot in surgical operations.

On the basis of any one of the foregoing embodiments, the joint angle measuring device is an absolute encoder.

In an embodiment, the joint angle measuring device is an absolute encoder, for example, a photoelectric absolute encoder may be used to measure the joint angle. While a relative encoder needs a relative zero point to determine the actual measured value, the absolute encoder has the structural characteristic that determines the uniqueness of each measured value and do not require a reference zero point.

In the embodiment of the present application, an absolute encoder is used, which avoids the calibration of the zero point during use, thereby simplifying the use of the tandem positioning arm.

On the basis of any one of the foregoing embodiments, the positioning arm has a hollow structure.

In an embodiment, the body of the positioning arm may have a structure of hollow interior which reduces the weight of the body and improves operational flexibility. The structure of hollow interior may also accommodate the internal electrical connecting lines of the dental robot system, reducing the volume of the dental robot.

On the basis of any one of the foregoing embodiments, the positioning arm is made of at least one of engineering plastics, aluminum alloy and carbon fiber.

In an embodiment, the positioning arm may be made of high-strength lightweight materials such as engineering plastics, aluminum alloy or carbon fiber so as to reduce the weight of the body.

On the basis of any one of the foregoing embodiments, a servo torque motor is mounted at each of the rotary joints.

In an embodiment, a small servo torque motor is mounted at each rotary joint. The gravitational moment at each rotary joint may be calculated according to the robot dynamics model, and the torque provided by the servo torque motor offsets the gravitational moment, making it more flexible and convenient to drag the tandem positioning arm.

On the basis of any one of the foregoing embodiments, the dental robot further includes a dental treatment chair; wherein a head clamping device disposed on both sides of a headrest of the dental treatment chair has a pinion-rack locking structure; and the tandem positioning arm is fixedly mounted on an equipment base of the dental treatment chair by the pedestal.

Figure 2:
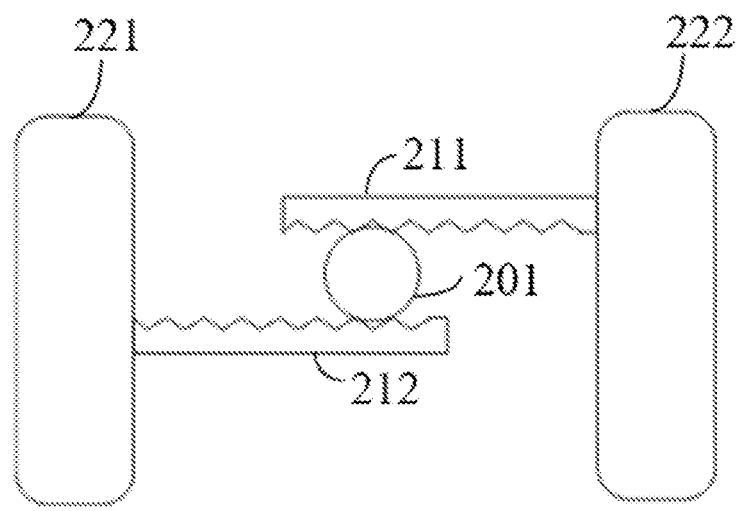
FIG. 2 is a schematic structural diagram of a head clamping device according to an embodiment of the present application.

In an embodiment, the dental robot further includes a dental treatment chair. In order to better hold the patient's head, the head clamping device on both sides of the headrest of the dental treatment chair has a pinion-rack locking structure. FIG. 2 is a schematic structural diagram of a head clamping device according to an embodiment of the present application. As shown in FIG. 2, the head clamping device includes a pinion 201, a first rack 211, a second rack 212, a first head support 221, and a second head support 222. The pinion 201 may be rotated by a knob to drive the first rack 211 and the second rack 212 to move toward each other, and the distance between the first head support 221 and the second head support 222 is adjusted to realize the function of fixing the patient's head.

Being fixedly mounted to the equipment base of the dental treatment chair by the pedestal, the tandem positioning arm is conveniently dragged to the area to be operated in the patient's mouth.

On the basis of any one of the foregoing embodiments, the dental robot further includes a visual navigator; and the visual navigator is fixedly mounted on the equipment base of the dental treatment chair through a support arm.

In an embodiment, the visual navigator can track the visual markers on the area to be operated and on the surgical instruments in real time, and detect their spatial positions in real time to guide the completion of the dental surgery.

On the basis of any one of the foregoing embodiments, FIG. 3 is a schematic structural diagram of a dental robot system according to an embodiment of the present application. As shown in FIG. 3, the dental robot system includes a tandem positioning arm 301, a dental treatment chair 302, a visual navigator 303, and a surgical instrument 304.

In an embodiment, during use, the patient lies flat on the dental treatment chair, the dentist drags the tandem positioning arm 301, and uses the surgical instrument 304 clamped by the jacket at the end of the tandem positioning arm 301 to perform oral surgery. When the patient's head moves, the dentist may also use the visual navigator 303 to track the visual markers on the areas to be operated and on the surgical instruments to complete the oral surgery.

On the basis of any one of the foregoing embodiments, FIG. 4 is a schematic flowchart of an oral navigation method according to an embodiment of the present application. As shown in FIG. 4, the method includes:

step 410, determining a coordinate position of a surgical instrument clamped by the jacket disposed at a top of the tandem positioning arm in a coordinate system of dental robot based on joint angles measured by each joint angle measuring device in the tandem positioning arm.

In an embodiment, the coordinate system of dental robot is established according to structural parameters of the dental robot, and the pedestal of the tandem positioning arm may be selected as the origin of the coordinate system. The selection of the origin of the coordinate system of dental robot is not specifically defined in the embodiments of the present application.

According to the joint angles measured by each joint angle measuring device in the tandem positioning arm, a D-H (Denavit Hartenberg) method in robot kinematics may be used to calculate the position of the jacket at the top of the tandem positioning arm in real time. Therefore, the position of the jacket may be accurately determined when the tandem positioning arm is dragged to perform surgical operations in its working space.

The surgical instrument may specifically be a dental medical instrument, such as a dental implant handpiece, a repair handpiece, and the like. The jacket is capable of clamping different surgical instruments for oral surgery. After being subjected to position and posture calibration, the surgical instrument is mounted on the jacket of the tandem positioning arm. The coordinate position of the surgical instrument in the coordinate system of dental robot may be determined according to calibration parameters of the surgical instrument relative to the jacket of the tandem positioning arm.

Step 420, converting the coordinate position of the surgical instrument in the coordinate system of dental robot to a coordinate position of the surgical instrument in a coordinate system of three-dimensional image.

In an embodiment, the three-dimensional image may be a three-dimensional image of the patient's oral cavity obtained by using CBCT (cone beam computed tomography, X-ray tomography) technology, which is also called cone beam CT. The coordinate system of three-dimensional image may be established based on the three-dimensional image of the patient's oral cavity.

According to the spatial mapping relationship between the coordinate system of dental robot and the coordinate system of three-dimensional image, the coordinate position of the surgical instrument in the coordinate system of dental robot may be converted to the coordinate position of the surgical instrument in the coordinate system of three-dimensional image. The spatial mapping relationship can be pre-calibrated.

Step 430, performing oral navigation based on the coordinate position of the surgical instrument in the coordinate system of three-dimensional image and preset surgical paths in the coordinate system of three-dimensional image.

In an embodiment, presetting the surgical path refers to planning in advance for the surgical operations in the coordinate system of three-dimensional image and determining the movement path of the surgical instrument in the coordinate system of three-dimensional image.

During oral surgery, the tandem positioning arm is dragged to match the coordinate position of the surgical instrument in the coordinate system of three-dimensional image with the preset surgical path in the coordinate system of three-dimensional image to obtain the real-time position error of the surgical instrument, thereby guiding the dentist to complete oral surgery operations.

In the oral navigation method provided by the embodiment of the present application, the coordinate position of the surgical instrument in the coordinate system of dental robot is converted into the coordinate position of the surgical instrument in the coordinate system of three-dimensional image, and then is matched with the preset surgical path in the coordinate system of three-dimensional image, so that the movement path of the surgical instrument is positioned during the oral surgery, which guides the dentist to perform the surgical operations, reduces the difficulty of the surgical operations, and ensures the safety of the surgery. In addition, in this oral navigation method, there are no problems such as visual occlusion associated with the use of optical navigation instruments.

On the basis of any one of the foregoing embodiments, step 420 includes:

converting the coordinate position of the surgical instrument in the coordinate system of dental robot to the coordinate position of the surgical instrument in the coordinate system of three-dimensional image based on spatial mapping relationship;

where the spatial mapping relationship is determined based on coordinate positions of preset feature points on the three-dimensional image in the coordinate system of dental robot.

In an embodiment, the spatial mapping relationship is a position-conversion relationship of a coordinate point from the coordinate system of dental robot to the coordinate system of three-dimensional image, which may be determined by the coordinate position of the preset feature points on the three-dimensional image in the coordinate system of dental robot.

The preset feature points are positioning points set in advance whose coordinate positions in the three-dimensional image have been determined by markers. The number of preset feature points is at least 3. The coordinate position of each preset feature point in the coordinate system of dental robot is obtained by dragging the tandem positioning arm and using the tip part of the surgical instrument or the mounted calibration probe to touch parts of the patient's tooth that correspond to positions of the preset feature points in the three-dimensional image one to one. The coordinate positions of the preset feature points in the coordinate system of dental robot and the coordinate system of three-dimensional image respectively are mapped and registered to obtain the spatial mapping relationship.

The mapping registration algorithm may be the ICP algorithm (iterative closest point algorithm), and the selection of the registration algorithm is not specifically defined in the embodiments of the present application.

On the basis of any one of the foregoing embodiments, after step 430, the method further includes:

determining the contact stiffness of the tandem positioning arm based on a preset working area of the surgical instrument in the three-dimensional image and the coordinate position of the surgical instrument in the coordinate system of three-dimensional image; and adjusting the output torque of the servo torque motor at each rotary joint in the tandem positioning arm based on the contact stiffness of the tandem positioning arm.

In an embodiment, for oral surgery, an operation area can be preplanned in the three-dimensional image, so as to obtain a preset working area. For example, for molar restoration surgery, the grinding area and non-grinding area may be preplanned in the three-dimensional image.

When the surgical instrument is dragged for surgery, the positional relationship between the surgical instrument and the preset working area is judged according to the coordinate position of the surgical instrument in the coordinate system of three-dimensional image, and the contact stiffness of the tandem positioning arm is determined. The contact stiffness is the sensitivity of the tandem positioning arm when the tandem positioning arm is dragged. For example, when the surgical instrument is located in the grinding area, the contact stiffness is zero, and dragging can be carried out freely; when the surgical instrument is close to the non-grinding area, the contact stiffness is not zero and increases as the distance to the non-grinding area decreases, and a certain amount of force is required for dragging.

According to the contact stiffness of the tandem positioning arm, an output torque of the servo torque motor at each rotary joint in the tandem positioning arm is adjusted, so that the dentist may obtain force-sensitive feedback when dragging the tandem positioning arm, thereby improving the accuracy of surgery and operating safety, avoiding injury to healthy tissue.

The output torque of the servo torque motor is adjusted by calculating the torque that each servo torque motor should output during dragging based on the preset parameters such as contact stiffness and damping, so that the sensitivity of the tandem positioning arm may be dynamically changed, and different force-sensitive feedback may be given to the dentist.

In the oral navigation method provided by the embodiments of the present application, the output torque of the servo torque motor at each rotary joint is adjusted according to the preset working area of the surgical instrument in the three-dimensional image and the coordinate position of the surgical instrument in the coordinate system of three-dimensional image, thereby giving the dentist different force-sensitive feedback and improving the safety of the oral surgery operation.

On the basis of any one of the foregoing embodiments, before step 430, the method further includes:

determining the relative position of an area to be operated and the surgical instrument based on the positions of visual markers respectively disposed on the area to be operated and the surgical instrument;

converting the relative position to a three-dimensional coordinate system to obtain a three-dimensional relative position; and adjusting a coordinate position of the area to be operated in the coordinate system of three-dimensional image based on the coordinate position of the surgical instrument in the coordinate system of three-dimensional image and the three-dimensional relative position.

In an embodiment, for some operations where the accuracy greatly affects the surgical effect, such as dental implant surgery, even if the patient's head and jaw are fixed by the clamping device, small position changes may occur, and prolonged clamping and fixation may cause discomfort to the patient. Visual markers may be disposed on the area to be operated in the patient's oral cavity and the surgical instrument respectively, the visual markers in the field of view may be tracked through the visual navigator, and the positions of the visual markers on the area to be operated and the surgical instrument may be detected in real time.

According to the positions of the visual markers respectively disposed on the area to be operated and the surgical instrument, the relative position of the area to be operated and the surgical instrument is determined, and the relative position is converted to a three-dimensional coordinate system to obtain a three-dimensional relative position.

According to the coordinate position of the surgical instrument in the coordinate system of three-dimensional image and the three-dimensional relative position, the coordinate position of the area to be operated in the coordinate system of three-dimensional image is adjusted, so that the adjusted area to be operated can adapt to the position changes of the patient's head and jaw, so as to continue to guide the dentist to complete the oral surgery operation.

In the oral navigation method provided by the embodiments of the present application, the visual markers respectively disposed on the area to be operated and the surgical instrument are tracked by a visual navigator, and the coordinate position of the area to be operated in the coordinate system of three-dimensional image is adjusted in real time, thereby improving the accuracy of oral surgery operation.

On the basis of any one of the foregoing embodiments, the visual marker of the area to be operated is mounted by an oral guide which is determined based on a three-dimensional curved surface of dentition within the area to be operated.

In an embodiment, in order to accurately perform the surgery operation even when the patient's head moves, a patient tracking device may be mounted on the patient's jaw.

Figure 5:
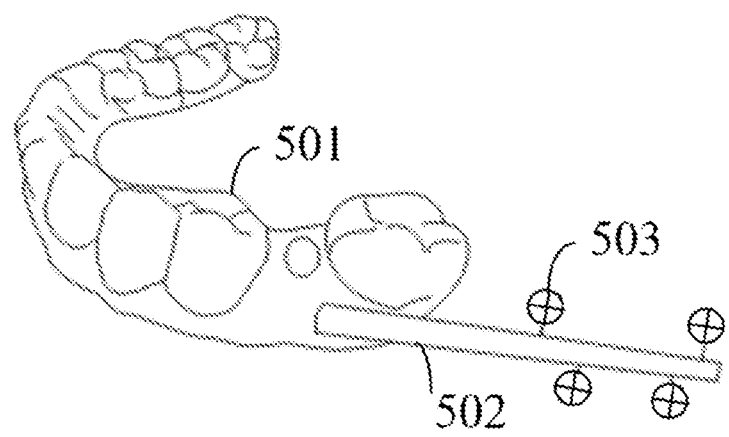
FIG. 5 is a schematic structural diagram of a patient tracking device according to an embodiment of the present application.

FIG. 5 is a schematic structural diagram of a patient tracking device according to an embodiment of the present application. As shown in FIG. 5, the patient tracking device includes an oral guide 501, a connecting rod 502, and a visual marker 503 of the area to be operated. The visual marker 503 is connected to the oral guide 501 through the connecting rod 502. The patient tracking device may be quickly manufactured using 3D printing and other methods.

The oral guide 501 is determined based on a three-dimensional curved surface of dentition within the area to be operated in the patient's oral cavity, and may be installed in a manner that strictly fits the patient's dentition. In an oral surgery, after the patient's dentition wears the device, the position of the patient's jaw may be detected in real time through the visual navigation instrument.

The above-mentioned device embodiments are merely illustrative, wherein, the units described as separate components may or may not be physically separated, and the components displayed as units may or may not be physical units, that is, they may be located at one place or distributed across multiple network units. Some or all of the modules may be selected according to the actual needs to achieve the purpose of the embodiments. Those of ordinary skill in the art can understand and implement them without paying creative labor.

Through the above description of implementations, those of ordinary skill in the art can clearly understand that the various implementations can be implemented by software and necessary general hardware platform, and of course, by hardware. Based on such understanding, the above technical solutions in essence or a part thereof that contributes to the prior art can be embodied in the form of software products. The computer software products can be stored in computer-readable storage media, such as ROM/RAM, magnetic disk, compact disk, including several instructions to cause a computer device (which can be a personal computer, server, network device and the like) to perform the methods described in various embodiments or a part of the embodiments.

Finally, it should be noted that the embodiments above are only for illustrating the technical solutions of the present application, rather than limiting them; although the present application has been described in detail with reference to the foregoing embodiments, those skilled in the art should understand that the technical solutions documented in the preceding embodiments may still be modified, or parts of the technical features thereof may be equivalently substituted; and such modifications or substitutions do not separate the essence of the corresponding technical solutions from the spirit and scope of the technical solutions of various embodiments of the present application.

The invention claimed is:

1. A dental robot for oral and maxillofacial surgical operations, comprising:
   a dental treatment chair;
   a tandem positioning arm comprising a pedestal, several positioning arms and a jacket, wherein the tandem positioning arm is fixedly mounted on an equipment base of the dental treatment chair by the pedestal, the jacket is configured to clamp surgical instruments,; and the pedestal, the several positioning arms and the jacket are connected in series in sequence by rotary joints;
   a joint angle measuring device is-mounted at each of the rotary joints;
   a servo torque motor is-mounted at each of the rotary joints in the tandem positioning arm;
   a visual navigator fixedly mounted on the equipment base of the dental treatment chair through a support arm, wherein the visual navigator is configured to track visual markers on an area to be operated in real time to detect their spatial positions in real time; and
   wherein a contact stiffness of the tandem positioning arm is determined based on a preset working area of the surgical instruments in a three-dimensional image of a patient's oral cavity and the coordinate position of the surgical instruments in a coordinate system of three-dimensional image, and the contact stiffness is the sensitivity of the tandem positioning arm when the tandem positioning arm is dragged by dentists;
   wherein an output torque of the servo torque motor at each of the rotary joints is adjusted based on the contact stiffness of the tandem positioning arm to give the dentists force-sensitive feedback; and
   wherein, when the surgical instruments are located in the preset working area, the contact stiffness is zero to enable the tandem positioning arm to be dragged freely, and when the surgical instruments are close to a non-preset working area, the contact stiffness is not zero and increases as the distance to the non-preset working area decreases.

2. The dental robot of claim 1, wherein the joint angle measuring device is an absolute encoder.

3. The dental robot of claim 1, wherein the positioning arm has a hollow structure.

4. The dental robot of claim 1, wherein
   a head clamping device disposed on both sides of a headrest of the dental treatment chair has a pinion-rack locking structure.

5. An oral navigation method based on the dental robot of claim 1, comprising:
   determining a coordinate position of a surgical instrument clamped by the jacket disposed at a top of the tandem positioning arm in a coordinate system of dental robot based on joint angles measured by each joint angle measuring device in the tandem positioning arm;
   converting the coordinate position of the surgical instrument in the coordinate system of dental robot to a coordinate position of the surgical instrument in a coordinate system of three-dimensional image; and
   performing oral navigation based on the coordinate position of the surgical instrument in the coordinate system of three-dimensional image and preset surgical paths in the coordinate system of three-dimensional image.

6. The oral navigation method of claim 5, wherein the converting the coordinate position of the surgical instrument in the coordinate system of dental robot to a coordinate position of the surgical instrument in a coordinate system of three-dimensional image comprises:
   converting the coordinate position of the surgical instrument in the coordinate system of dental robot to the coordinate position of the surgical instrument in the coordinate system of three-dimensional image based on a spatial mapping relationship;
   wherein the spatial mapping relationship is determined based on coordinate positions of preset feature points on the three-dimensional image in the coordinate system of dental robot.

7. The oral navigation method of claim 5, after the performing oral navigation based on the coordinate position of the surgical instrument in the coordinate system of three-dimensional image and preset surgical paths in the coordinate system of three-dimensional image, further comprising:
   determining a contact stiffness of the tandem positioning arm based on a preset working area of the surgical instrument in the three-dimensional image and the coordinate position of the surgical instrument in the coordinate system of three-dimensional image; and
   adjusting an output torque of a servo torque motor at each rotary joint in the tandem positioning arm based on the contact stiffness of the tandem positioning arm.

8. The oral navigation method of claim 5, before the performing oral navigation based on the coordinate position of the surgical instrument in the coordinate system of three-dimensional image and preset surgical paths in the coordinate system of three-dimensional image, further comprising:
   determining a relative position of an area to be operated and the surgical instrument based on the positions of visual markers respectively disposed on the area to be operated and the surgical instrument;
   converting the relative position to a three-dimensional coordinate system to obtain a three-dimensional relative position; and
   adjusting a coordinate position of the area to be operated in the coordinate system of three-dimensional image based on the coordinate position of the surgical instrument in the coordinate system of three-dimensional image and the three-dimensional relative position.

9. The oral navigation method of claim 8, wherein the visual marker of the area to be operated is mounted by an oral guide which is determined based on a three-dimensional curved surface of dentition within the area to be operated.

10. An oral navigation method based on the dental robot of claim 2, comprising:
    determining a coordinate position of a surgical instrument clamped by the jacket disposed at a top of the tandem positioning arm in a coordinate system of dental robot based on joint angles measured by each joint angle measuring device in the tandem positioning arm;
    converting the coordinate position of the surgical instrument in the coordinate system of dental robot to a coordinate position of the surgical instrument in a coordinate system of three-dimensional image; and
    performing oral navigation based on the coordinate position of the surgical instrument in the coordinate system of three-dimensional image and preset surgical paths in the coordinate system of three-dimensional image.

11. An oral navigation method based on the dental robot of claim 3, comprising:
    determining a coordinate position of a surgical instrument clamped by the jacket disposed at a top of the tandem positioning arm in a coordinate system of dental robot based on joint angles measured by each joint angle measuring device in the tandem positioning arm;
    converting the coordinate position of the surgical instrument in the coordinate system of dental robot to a coordinate position of the surgical instrument in a coordinate system of three-dimensional image; and
    performing oral navigation based on the coordinate position of the surgical instrument in the coordinate system of three-dimensional image and preset surgical paths in the coordinate system of three-dimensional image.

12. An oral navigation method based on the dental robot of claim 4, comprising:
    determining a coordinate position of a surgical instrument clamped by the jacket disposed at a top of the tandem positioning arm in a coordinate system of dental robot based on joint angles measured by each joint angle measuring device in the tandem positioning arm;
    converting the coordinate position of the surgical instrument in the coordinate system of dental robot to a coordinate position of the surgical instrument in a coordinate system of three-dimensional image; and
    performing oral navigation based on the coordinate position of the surgical instrument in the coordinate system of three-dimensional image and preset surgical paths in the coordinate system of three-dimensional image.

* * * * *